United States Patent Office 3,068,241
Patented Dec. 11, 1962

3,068,241
TRI-α-THIENYL SILANE
Herbert Sargent, Glen Rock, N.J., assignor to United States Rubber Company, New York, N.Y., a corporation of New Jersey
No Drawing. Filed Nov. 17, 1948, Ser. No. 60,637
1 Claim. (Cl. 260—329)

My invention is a new compound tri-α-thienyl silane, which is useful in the formulation of lubricating oils, and is likewise effective as a high-boiling plasticizer, as a textile assistant, as an additive for combustion engine fuels and as a synthetic intermediate.

Although a wide variety of organo-silicon compounds have been synthesized, particularly in recent years, the majority of such materials have been restricted to silanes in which the organic substituents are alkyl, aryl and/or aralkyl groups. I have now discovered a novel and useful silane bearing heterocyclic substituents, tri-α-thienyl silane. This is a stable, high-boiling compound which is readily synthesized by the reaction of α-thienyl magnesium bromide with trichlorosilane. This new compound has the formula

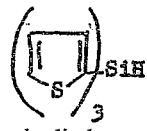

The following example discloses my invention in more detail.

EXAMPLE 1

A mixture of 90.0 g. of α-bromothiophene and 200 ml. of diethyl ether is slowly added to 12 g. of finely divided magnesium metal during the course of 3 hours. To this solution are then added 16 g. of trichlorosilane in 150 ml. of diethyl ether during the course of 0.75 hour.

At the end of the reaction, a solution of 100 ml. of water and 20 ml. of concentrated hydrochloric acid is slowly added to the stirred reaction mixture during the course of an hour. The organic layer is then separated, dried and fractionally distilled to yield 26 g. of tri-α-thienyl silane, B. 150–5° C./0.5 m., $N_D^{20}$

Analyses

| | Percent C | Percent Si | Percent S |
|---|---|---|---|
| Found | 51.3 | 10.40 | 33.5 |
| Theory | 51.2 | 9.95 | 34.1 |

The compound of the present invention presents the unexpected advantage over alkyl, aryl and aralkyl silanes of the prior art in that the present compound reacts with oxidizing agents such as fuming nitric acid to secure spontaneous ignition of the mixture. Such mixtures are highly useful for use as chemical igniters for hydrocarbon fuels in jet propulsion.

I claim:
As a new chemical compound tri-α-thienyl silane.

References Cited in the file of this patent

Bernthsen and Sudborough: "Organic Chemistry," page 549, 1925 edition.
Burkhard et al.: Chem. Rev., vol. 41, page 110, August (1947).
Caesar et al.: Ind. Eng. Chem. vol. 40, No. 5, page 922, May (1948).